United States Patent [19]

Sosson

[11] Patent Number: 4,850,941

[45] Date of Patent: Jul. 25, 1989

[54] HYDRAULICALLY CONTROLLED TIGHTENER, IN PARTICULAR FOR A CHAIN

[75] Inventor: Pierre Sosson, Sartrouville, France

[73] Assignees: Compagnie Des Transmissions Mecaniques Sedis, Nanterre Cedex; Sachs Huret S.A., Nanterre, both of France

[21] Appl. No.: 153,929

[22] Filed: Feb. 9, 1988

[30] Foreign Application Priority Data

Feb. 9, 1987 [FR] France ................................. 87 01553

[51] Int. Cl.⁴ .............................................. F16H 7/08
[52] U.S. Cl. ..................................... 474/110; 474/138
[58] Field of Search ............... 474/101, 109, 110, 111, 474/133, 135, 136, 138

[56] References Cited

U.S. PATENT DOCUMENTS

| 4,539,001 | 9/1985 | Okabe | 474/138 |
| 4,657,524 | 4/1987 | Okabe | 474/110 |

*Primary Examiner*—Thuy M. Bui
*Attorney, Agent, or Firm*—Burns, Doane, Swecker & Mathis

[57] ABSTRACT

The hydraulic tightener includes a body defining a cylindrical cavity, a piston slidably mounted in the cavity and a pressure-applying shoe for applying pressure against an endless connection such as a chain. Associated with the piston there is a high pressure chamber defined by part of the cavity and the piston, the high pressure chamber being connected to a source of hydraulic fluid under pressure through a check-valve. This high pressure chamber is fluidtight and has no orifice other than the orifice provided with the check-valve. The tightener also serves to lubricate the endless connection or chain by spraying the hydraulic fluid thereon.

8 Claims, 1 Drawing Sheet

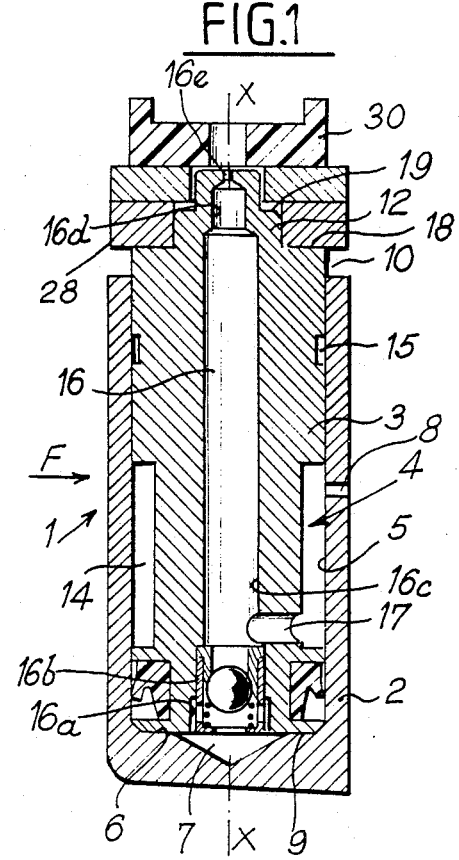
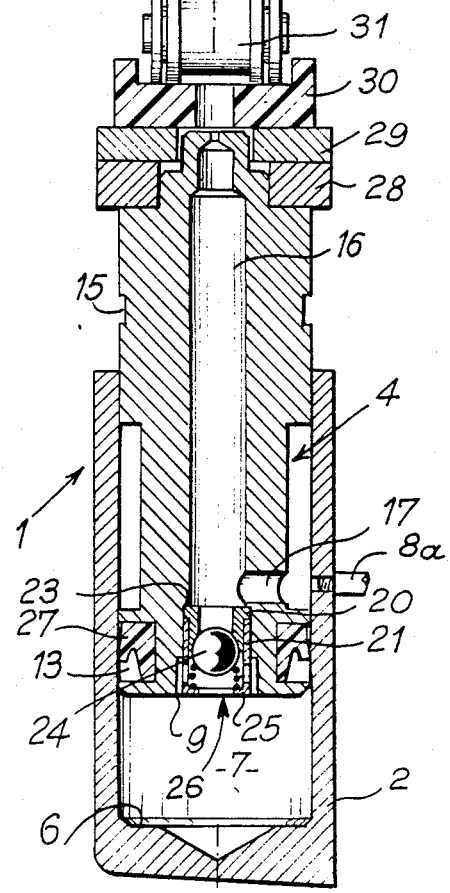
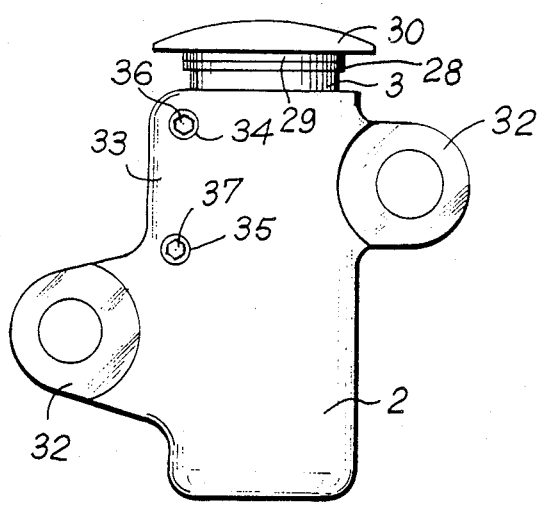

HYDRAULICALLY CONTROLLED TIGHTENER, IN PARTICULAR FOR A CHAIN

The present invention relates to hydraulically controlled tighteners, in particular for chains or other endless connections.

Hydraulically controlled chain tightening devices are known. French patent application FR-A-No. 2 526 908 discloses a hydraulic chain tightener for an internal combustione engine, comprising a hollow piston for tightening the chain mounted to be movable in a longitudinal direction in a bore of a hydraulic housing, said piston being connected in its lower part to a pressure chamber and including in its upper part facing toward the chain a throttling plug through which air can escape from the interior of the hydraulic body. Provided between the throttling plug and the pressure chamber is an expansion chamber separated from the pressure chamber by a check-valve. Further, the pressure chamber communicates with a fore chamber through a ball check-valve. Said fore chamber is itself connected to an oil projecting tube through a pressure limiting ball valve.

The realization of such a device is relatively costly, space-consuming and complex, in particular owing to the presence of a plurality of chambers and a plurality of valves.

An object of the present invention is to provide a simpler and cheaper hydraulic tightener which is also capable of reducing possible movements of the chain or other endless connection.

The invention therefore provides a hydraulic tightener in particular for a chain or other endless connection, comprising a body defining a cylindrical cavity, a piston slidably mounted in the cavity, a pressure shoe biased by the piston and in contact with the endless connection, a high pressure chamber defined by a part of the cavity and the piston, said high pressure chamber being connected to a source of hydraulic fluid under pressure through a check-valve, wherein the high pressure chamber is sealed and has only one orifice communicating through the check-valve with the source of hydraulic fluid under pressure.

According to other features:

the cavity has an end wall and a cylindrical lateral wall, and the high pressure chamber is defined by said end wall, a part of said cylindrical wall and an end wall of the piston, said check-valve being disposed in the piston and preventing flow from the high pressure chamber toward the source of hydraulic fluid under pressure;

the body includes in its lateral wall an orifice connected to the source of hydraulic fluid under pressure, the piston defining, on one hand, with the lateral wall of the body, a chamber onto which the orifice opens and, on the other hand, an inner chamber, said two chambers communicating through at least one orifice provided in the lateral wall of the piston, said inner chamber being connected to the high pressure chamber through a passageway provided in the end wall of the piston and in which the check-valve is disposed;

the inner chamber comprises, at the end thereof opposed to that communicating with the high pressure chamber, a jet spraying the hydraulic fluid under pressure in the direction of the chain or other endless connection;

the body includes means for limiting the stroke of the piston;

said limiting means comprise a bore containing a pin partly received in the circular cavity of the piston limiting the stroke of the piston outwardly of the body and coming into abutment against an end wall of said circular cavity;

the piston comprises a groove cooperating with a pin disposed in a bore of the body for blocking the piston in an inner position for a pre-mounting on a member or for storage;

the piston includes on its outer surface a groove provided with a sealing element between said outer surface and the lateral wall of the cavity.

The invention will be described in more detail hereinafter with reference to the accompanying drawings which are given solely by way of example and in which:

FIG. 1 is a sectional view of a tightener according to the invention before it has been placed in position, in its pre-mounting position on a member or for storage;

FIG. 2 is a sectional view similar to FIG. 1 of the tightener according to the invention when in service;

FIG. 3 is a view of the tightener shown in FIG. 1 in the direction of arrow F in the latter.

FIGS. 1 and 2 are sectional views of a tightener 1 comprising a hollow cylindrical body 2 which is open at one end and a piston 3 movably mounted in this body.

Bored in the body 2 on the axis X—X is a cavity 4 defined by a cylindrical lateral wall 5 and an end wall 6. A chamber 7 is machined in the end wall 6. This chamber has an axis coincident with axis X—X.

The lateral wall 5 is provided with a radial orifice 8 located at about equal distances from the end wall 6 of the cavity 4 and the open end of the latter to permit the supply of hydraulic fluid under pressure to the inner chamber formed by the cavity 4 and the cylindrical lateral wall 5.

This radial orifice 8 is connected by a pipe 8a to this source of fluid under pressure (not shown).

The piston 3 has a planar end 9 and a stepped end 12. The piston comprises on the cylindrical surface 10 thereof starting at its planar end 9, first a groove 13, then a circular recess 14 and lastly a circular groove 15. The three elements are separated from one another. Extending through the piston is an axial stepped bore 16 having five steps (16a, 16b, 16c, 16d, 16e) of diameters which decrease from the planar end 9 of the piston 3 to the opposite end thereof.

The step 16a has a diameter less than the maximum diameter of the chamber 7, the latter being therefore partly closed by the planar end 9 of the piston 3.

The circular recess 14 is connected to the step 16c of the axial bore 16 by a radial aperture 17.

The stepped end 12 of the piston has two steps of decreasing section which thus form two shoulders 18, 19.

The bore 16b of the axial bore 16 receives a shouldered bushing. This shouldered bushing 20 has an inside diameter less than the diameter of the bore 16c and close to the diameter of the bore 16d of the axial bore 16. The outside diameter of the shoulder of this bushing 20 is slightly less than the diameter of the bore 16b. The outer surface of the shouldered bushing 20 includes a cylindrical recess which forms with the cylindrical surface of the bore 16b a cavity 21. The recess extends from under the shoulder of the bushing 20 to the second end of the latter. The first end bears against a shoulder 23 between the bores 16b and 16c.

The second end of the bushing 20 forms a seat for a ball 24.

A cylindrical sleeve 25 provided with orifices is a drive fit in the cavity 21, the bottom of the sleeve being remote from said second end of the bushing 20. A spring completes the valve 26 and bears against the end of the sleeve and biases the ball 24 to a position in which it bears against its seat for closing the orifice of the bushing 20.

The groove 13 provided on the outer surface of the piston receives a sealing element 27 having lips adapted to provide the seal between the outer surface 10 of the piston and the lateral wall 5 of the body 2.

Whatever be the position of the piston 3, the circular recess 14 of the latter communicates with the orifice 8.

A washer 28 bears against the stepped end 12 of the piston 3 and a support plate 29 bears against this washer. This support plate 29 has a bore which is coaxial with the axis of the piston and has a diameter at least equal to the diameter of the smallest step of the stepped end 12 of the piston 3. This support plate is connected to a tightening shoe 30 adapted to be placed in contact with a chain 31 (see FIG. 2). The shoe 30 is provided with a bore coaxial with the axis of the piston 3.

FIG. 3 shows that the cylindrical body 2 further comprises two fixing lugs 32 for fixing the tightener, for example inside an engine case. The body 2 also includes a longitudinal rib 33 between its open end and a fixing lug 32 of the body.

Provided in this rib 33 are two cylindrical bores 34 and 35 whose axes are perpendicular to the cylindrical body and substantially tangent to the latter.

As the piston 3 is urged into the cylindrical body 2 when storing the assembly, the bore 34 receives a pin 36 a part of which is located in the groove 15 for locking the piston in position.

Placed in the bore 35 is a pin 37 a part of which is disposed in the circular recess 14. This pin 37 remains in position and limits the stroke of the piston when the pin 36 is withdrawn for rendering the assembly operative.

With the tightener in its storage or pre-mounting position, it is fixed by means of the lugs 32, for example to a suitable part of the engine case. The radial bore 8 is connected in the conventional manner (not show) to the oil pump of the motor.

The pin 36 locking the piston is then removed and this allows the latter to project out of the cylindrical body 2 and bring the shoe 30 into contact with the chain 31.

Indeed, the oil pump of the engine sends oil under pressure into the axial bore 16 of the piston through the orifice 8, the circular recess 14, the radial orifice 17. This oil comes to bear against the underside of the ball 24 and shifts the ball away from its seat in opposition to the action of the spring of the valve 26 and puts the axial bore 16 in communication with the chamber 7 and the latter is filled with oil under pressure. This oil exerts a thrust on the end 9 of the piston 3 and causes the latter to project out of the cylindrical body 2 which increases the volume of the chamber 7.

When the shoe 30 comes into contact with the chain, a resistance to the displacement of the piston is produced. This resistance results in a counter-pressure in the pressure chamber 7. This counter-pressure urges the ball 24 toward its seat and thus stops the previously-established communication. The chamber 7 becomes closed and sealed owing to the presence of the sealing element 27. It contains a quantity of oil including a small amount of air in the form of an emulsion.

As the oil pump of the engine continues to supply oil, the oil contained in the axial bore 16 is sprayed onto the chain 31 through the step 16e of the bore, which constitutes a jet thereby lubricating the chain.

When the counter-pressure increases, as only the air contained in the oil is compressible, the piston 3 is extremely slightly urged into the cylinder body 2 and thus prevents the movement of the chain.

As a result of wear, the chain becomes longer and creates a counter-pressure which is smaller in the chamber 7, the equilibrium then ceases and the pressure of the oil delivered by the oil pump of the engine eliminates the contact between the ball 24 and its seat. The oil enters under pressure the chamber 32 and urges the piston 3 until the shoe 31 exerts a sufficient pressure against the chain 31.

This device comprises a relatively small pressure chamber. It does not have, in this embodiment, a spring between the body and the piston or means of the throttling plug type for discharging the air.

Its construction and its machining are simple and it requires only a single check valve while permitting not only the avoidance of the movement of the chain, but also the lubrication of the latter.

I claim:

1. A hydraulic tightener, in particular for an endless connection such as a chain, said tightener comprising a body defining a cylindrical cavity, a piston slidably mounted in the cavity, a pressure-applying shoe associated with the piston so as to be biased by the piston into contact with the endless connection, a high pressure chamber defined by a part of said cavity and the piston, a check-valve for putting the high pressure chamber in communication with a source of hydraulic fluid under pressure, the high pressure chamber being fluidtight and defining a single orifice which communicates with the source of hydraulic fluid under pressure through the check-valve.

2. A tightener according to claim 1, wherein the cavity has an inner end wall and a cylindrical lateral wall and the high pressure chamber is defined by the inner end wall, a part of the cylindrical wall and an end wall of the piston, said check-valve being mounted in the piston and operative to prevent flow from the high pressure chamber to the source of hydraulic fluid under pressure.

3. A tightener according to claim 1, wherein the body has a lateral wall which defines an orifice for connection to the source of hydraulic fluid under pressure, the piston defining with the lateral wall of the body a chamber onto which the orifice defined by the lateral wall opens, and an inner chamber, the piston having an end wall and a lateral wall defining at least one orifice putting said two chambers in communication with each other, a passage defined by the end wall of the piston connecting said inner chamber to said high pressure chamber, the check-valve being disposed in said passage defined by the end wall of the piston.

4. A tightener according to claim 3, wherein the inner chamber has an end wall opposed to the end wall communicating with the high pressure chamber and a jet spraying fluid under prssure toward the endless communication is provided on said end wall of the inner chamber.

5. A tightener according to claim 1, further comprising means on the body for limiting the travel of the piston.

6. A tightener according to claim 5, wherein said travel-limiting means comprise a bore in the body, a pin engaged in the bore in the body, a circular recess in the piston in which the pin is partly received for limiting the travel of the piston outwardly of the body by abutting against an end wall of the circular recess.

7. A tightener according to claim 1, wherein a groove is provided in the piston and a bore is provided in the body, and a pin is engaged in the bore of the body and is cooperative with the groove in the piston for locking the piston in a retracted piston in the body for storage purposes.

8. A tightener according to claim 1, wherein the piston defines an outer groove provided with a sealing element between the outer groove and a lateral wall of the cavity.

* * * * *